(12) United States Patent
Shimasaki et al.

(10) Patent No.: US 8,818,627 B2
(45) Date of Patent: Aug. 26, 2014

(54) REGENERATION CONTROL SYSTEM FOR VEHICLE

(75) Inventors: Yuichi Shimasaki, Mishima (JP);
Yoshinori Futonagane, Susono (JP);
Takuya Hirai, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/582,613

(22) PCT Filed: Mar. 2, 2010

(86) PCT No.: PCT/JP2010/053355
§ 371 (c)(1),
(2), (4) Date: Sep. 25, 2012

(87) PCT Pub. No.: WO2011/108081
PCT Pub. Date: Sep. 9, 2011

(65) Prior Publication Data
US 2013/0030647 A1     Jan. 31, 2013

(51) Int. Cl.
*G06F 7/00* (2006.01)
(52) U.S. Cl.
USPC ............................. 701/36; 180/65.26; 477/3
(58) Field of Classification Search
USPC .................. 701/22, 36, 55; 180/65.26; 477/3
See application file for complete search history.

(56) References Cited

U.S. PATENT DOCUMENTS

| | | | |
|---|---|---|---|
| 2003/0028295 A1* | 2/2003 | Wakashiro et al. | 701/22 |
| 2005/0104445 A1 | 5/2005 | Choi | |
| 2005/0258785 A1 | 11/2005 | Hommi et al. | |
| 2008/0017427 A1* | 1/2008 | Nakanowatari | 180/65.2 |
| 2008/0100132 A1 | 5/2008 | Jeon et al. | |
| 2009/0043437 A1* | 2/2009 | Shiino | 701/22 |
| 2012/0330505 A1* | 12/2012 | Tsumori et al. | 701/36 |

FOREIGN PATENT DOCUMENTS

| | | |
|---|---|---|
| CN | 1618649 A | 5/2005 |
| JP | A-8-98313 | 4/1996 |
| JP | A-2004-96822 | 3/2004 |
| JP | 2004353763 * | 12/2004 |
| JP | A-2004-353763 | 12/2004 |
| JP | A-2006-314178 | 11/2006 |
| JP | A-2010-4670 | 1/2010 |

OTHER PUBLICATIONS

International Search Report issued in International Patent Application No. PCT/JP2010/053355 dated Jun. 1, 2010.

* cited by examiner

*Primary Examiner* — Helal A Algahaim
*Assistant Examiner* — Shardul Patel
(74) *Attorney, Agent, or Firm* — Oliff PLC

(57) ABSTRACT

An object of the invention is to increase the recovered kinetic energy as much as possible in a regeneration control system for a vehicle that converts the kinetic energy of a wheel into electrical energy while the vehicle is decelerating. To achieve the object, in the invention, the electric energy generated by a generator is decreased at the time when the wheel slips. In consequence, the recovered kinetic energy can be made larger as compared to the case where the electric energy generated by the generator is decreased based on an anticipation of slippage of the wheel made in advance.

2 Claims, 8 Drawing Sheets

REGENERATION CONTROL SYSTEM FOR VEHICLE

TECHNICAL FIELD

The present invention relates to a technology of regenerating electrical energy from the kinetic energy of wheels while the vehicle is decelerating.

BACKGROUND ART

A technology of converting the kinetic energy of wheels into electrical energy (regeneration) in a motor vehicle or the like by actuating a generator utilizing the kinetic energy of wheels while the vehicle is decelerating is known.

An increase in the recovered kinetic energy (i.e. the electric energy generated by the generator) leads to an increase in the braking force (regenerative braking force) acting on the vehicle. For this reason, the deceleration of the vehicle can become higher than expected by the driver. In particular, if the regenerative braking force becomes large when the vehicle is running on a low friction road surface, slippage of the wheels can occur.

To eliminate the above-described problem, a technology in which the regenerative braking force is decreased by decreasing the recovered kinetic energy (electric energy generated by the generator) at the time when slippage of the wheels is anticipated to occur has been developed (see, for example, Patent Document 1).

PRIOR ART DOCUMENT

Patent Document

Patent Document 1: Japanese Patent Application Laid-Open No. 2006-314178

DISCLOSURE OF THE INVENTION

Problem to be Solved by the Invention

In the above-described prior art, since the electric energy generated by the generator is decreased before the wheels slip, there is a possibility that the amount of recovered kinetic energy may become small. For example, there may be a case in which the time interval since the time at which slippage of the wheels is anticipated to occur until the wheels actually slip is long and a case in which the wheels do not slip actually after slippage of the wheels is anticipated to occur.

The present invention has been made in view of the above-described various circumstances, and the object of the present invention is to increase the recovered kinetic energy as much as possible in a regeneration control system for a vehicle that converts the kinetic energy of wheels into electrical energy while the vehicle is decelerating.

Means for Solving the Problem

To solve the above-described problem, according to the present invention, in a regeneration control system for an vehicle that converts the kinetic energy of the wheels into electrical energy while the vehicle is decelerating, the electric energy generated by the generator is decreased at the time when a wheel slips. In other words, in the regeneration control system according to the present invention, the electric energy generated by the generator is not decreased until the wheel actually slips.

Specifically, according to the present invention, in a regeneration control system for a vehicle for converting the kinetic energy of a wheel into electrical energy by actuating a generator utilizing the kinetic energy of the wheel while the vehicle is decelerating, the electric energy generated by the generator is decreased when the wheel slips.

According to the invention described above, the electric energy generated by the generator is decreased at the time when the wheels actually slip. Therefore, the amount of recovered kinetic energy can be made larger as compared to the case where the electric energy generated by the generator is decreased based on an anticipation of slippage of the wheels made in advance. Moreover, since the decrease in the electric energy generated by the generator leads to a decrease in the regenerative braking force, the wheels can get out of slipping to grip the road again.

The regeneration control system for a vehicle according to the present invention is effective during deceleration without an operation of a friction brake. This is because in the case of slippage of the wheels during deceleration with an operation of a friction brake, it is possible to get the wheels out of slippage to cause them to grip the road again by reducing the braking force of the friction brake without decreasing the regenerative braking force.

As a method of detecting slippage of a wheel, it may be determined that a wheel is slipping if the difference between the angular velocity of a wheel that is mechanically interlocked with the generator (which will be hereinafter referred to as the "interlocked wheel") and the angular velocity of a wheel that is not mechanically interlocked with the generator (which will be hereinafter referred to as the "uninterlocked wheel") exceeds a predetermined criterion value. In this method, the angular velocity may be replaced by the angular acceleration.

As another method of detecting slippage of a wheel, it may be determined that a wheel is slipping if the degree of decrease in the electric energy generated by the generator exceeds a predetermined criterion value. By this method, slippage of a wheel can be detected even in the case of a vehicle that is not equipped with a sensor for measuring the angular velocity of the wheels.

In cases where the frictional coefficient of the road surface is high, where the gripping force of the wheels is large, where the friction in the internal combustion engine is high, or where the friction in the power transmission system is high, the deceleration of the vehicle can become excessively high. In particular, if the regenerative braking force becomes excessively large during deceleration without an operation of the friction brake, there is a possibility that the vehicle speed drops excessively or that the vehicle stops.

As a countermeasure, in the regeneration control system according to the present invention, the deceleration of the vehicle may be obtained, and the electric energy generated by the generator may be decreased when the obtained deceleration exceeds an allowable range. By this invention as such, a situation in which the deceleration of the vehicle becomes unduly high can be prevented from occurring. In consequence, a situation in which the vehicle speed drops excessively or the vehicle stops can be prevented from occurring during deceleration without a braking operation. The method of obtaining the deceleration of the vehicle may be differentiating the traveling speed of the vehicle with respect to time.

Advantageous Effect of the Invention

According to the present invention, in a regeneration control system for a vehicle that converts the kinetic energy of wheels into electrical energy by actuating a generator utilizing the kinetic energy of the wheels while the vehicle is decelerating, the recovered kinetic energy can be increased as much as possible, because the electric energy generated by the generator is not decreased until slippage of wheels is detected.

THE BEST MODE FOR CARRYING OUT THE INVENTION

Specific embodiments of the present invention will be described with reference to the drawings. The dimensions, materials, shapes and relative arrangements etc. of the components that will be described in connection with the embodiments are not intended to limit the technical scope of the present invention only to them, unless particularly stated.

Embodiment 1

Figure 1:
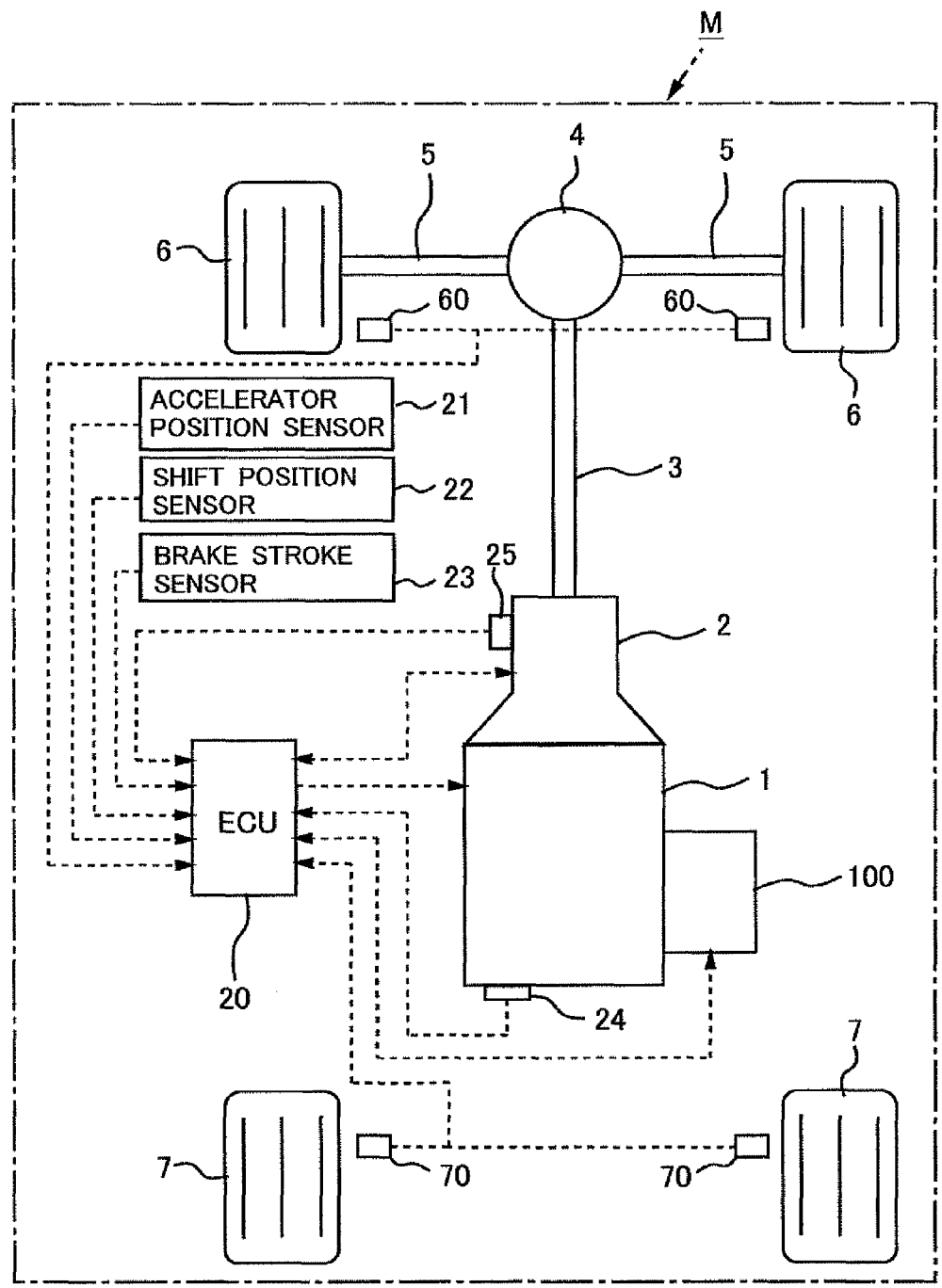
FIG. 1 is a diagram showing the general configuration of a vehicle to which the present invention is applied.

Firstly, a first embodiment of the present invention will be described with reference to FIGS. 1 to 4. FIG. 1 is a diagram showing the general configuration of a vehicle to which the present invention is applied. The vehicle M shown in FIG. 1 is an automobile having two pairs of wheels 6, 7.

The vehicle M is equipped with an internal combustion engine 1 as a motor. The output shaft of the internal combustion engine 1 is coupled with the input shaft of a transmission 2. The output shaft of the transmission 2 is coupled to a differential gear 4 via a propeller shaft 3. To the differential gear 4 are connected two drive shafts 5. The drive shafts 5 are connected to a pair of wheels 6. The other wheels 7 are suspended on the vehicle M in such are way that they can spin circumferentially. (In the following description, the wheels 6 will be referred to as the "drive wheels 6", and the wheels 7 will be referred to as the "undriven wheels 7".

The power output from the internal combustion engine 1 (i.e. the rotational torque of the output shaft) is subjected to gear change by the transmission 2, then transmitted to the propeller shaft 3, then reduced in speed by the differential gear 4, and then transmitted to the drive shaft 5 and the drive wheels 6.

Figure 2:
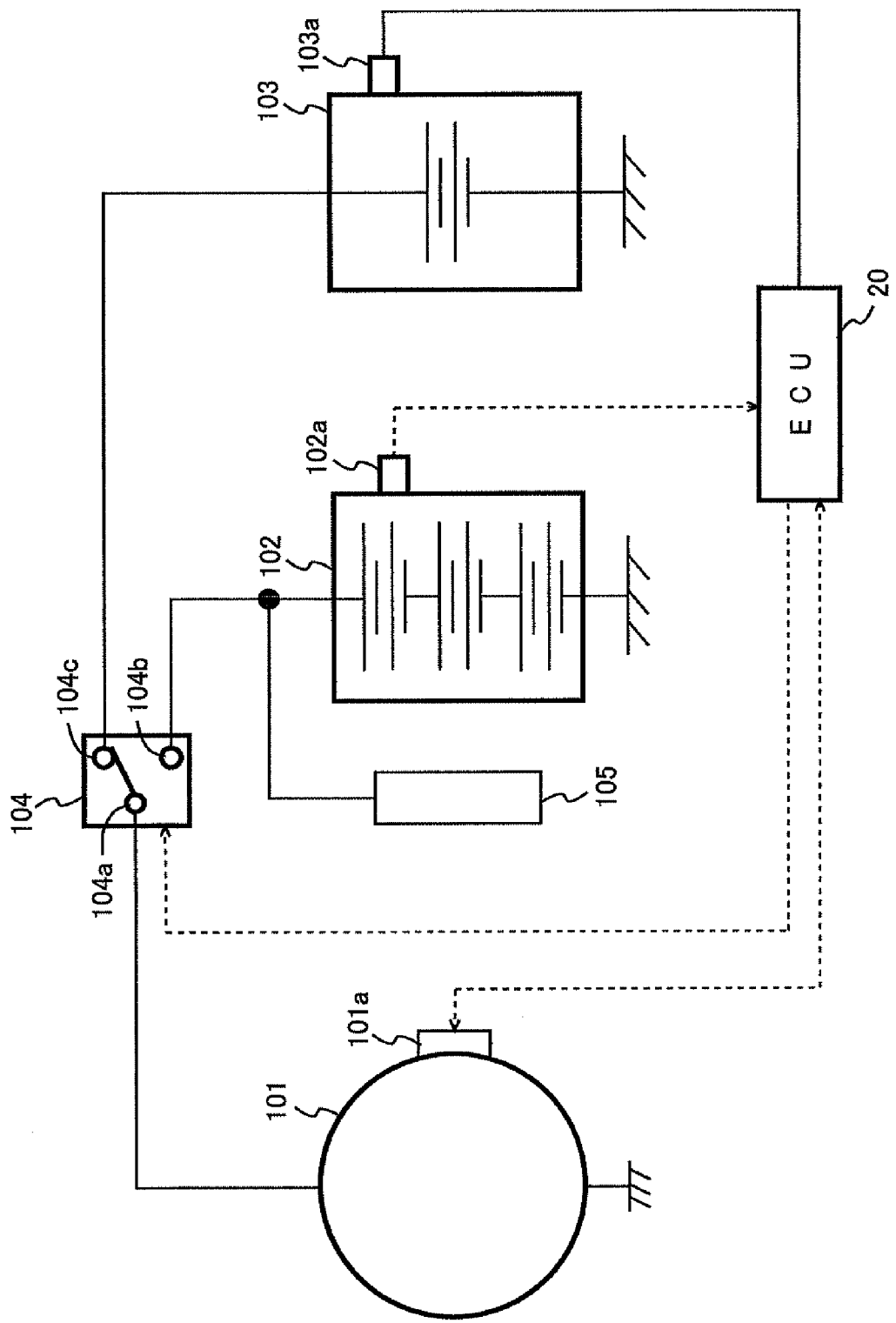
FIG. 2 is a diagram showing the general configuration of an electric power generation device according to the first embodiment

An electric power generation device 100 is annexed to the internal combustion engine 1. The electric power generation device 100 has an alternator 101, a high voltage battery 102, a low voltage battery 103, a selector switch 104, and a high voltage electric load 105 as shown in FIG. 2.

The alternator 101 is a generator that is linked with the output shaft (or a member that rotates in conjunction with the output shaft) of the internal combustion engine 1 by, for example, a pulley and a belt to convert the kinetic energy (or energy of rotation) of the output shaft into electric energy.

Specifically, the alternator 101 is a three-phase alternate current generator having a stator coil including three-phase coils, a field coil wound around a rotor, a rectifier that rectifies alternate current generated in the stator coil into direct current, and a regulator 101a for selectively turning on/off a field current supplied to the field coil.

When field current is supplied to the field coil, the alternator 101 having the above-described configuration generates induced current (three-phase alternate current) in the stator coil and rectifies the three-phase alternate current thus generated into direct current to output it.

The output of the alternator 101 is adapted to be supplied to an input terminal 104a of the selector switch 104. The selector switch 104 is a circuit having one input terminal 104a and two output terminals 104b, 104c to selectively connect the input terminal 104a to one of the two output terminals 104b, 104c.

One terminal 104b (which will be hereinafter referred to as the "first output terminal") among the two output terminals 104b, 104c of the selector switch 104 is connected to the high voltage battery 102 and the high voltage electric load 105. The other terminal 104c (which will be hereinafter referred to as the "second output terminal") among the two output terminals 104b, 104c is connected to the low voltage battery 103.

The high voltage battery 102 is a battery that can be charged and discharged at a high voltage (e.g. 42 volts or so). The high voltage battery 102 is a lead battery, a nickel hydrogen battery, or a lithium ion battery. The high voltage electric load 105 is an electric load that operates using high voltage electrical energy. Examples of the electric load as such include a defogger, an oil heater, an electric water pump, a motor-assisted turbo, an electrically-heated catalyst, and a stator motor. The low voltage battery 103 is a battery that can be charged and discharged at a voltage (e.g. 14 volts or so) lower than the high voltage battery 102. The low voltage battery 103 is a lead battery, a nickel hydrogen battery, or a lithium ion battery.

Returning to FIG. 1, the vehicle is annexed with an electronic control unit (ECU) 20 that electrically controls the internal combustion engine 1, the transmission 2, and the electric power generation device 100. Although FIG. 1 illustrates one ECU 20, there may be separately provided an ECU for the internal combustion engine 1, an ECU for the transmission 2, and an ECU for the electric power generation device 100.

Signals output from various sensors such as an accelerator position sensor 21, a shift position sensor 22, a brake stroke sensor 23, a crank position sensor 24, a vehicle speed sensor 25, a first SOC sensor 102a, a second SOC sensor 103a, a first wheel speed sensor 60, and a second wheel speed sensor 70 are adapted to input to the ECU 20.

The accelerator position sensor 21 is a sensor that outputs an electrical signal indicative of the amount of operation (or the amount of depression) of the accelerator pedal. The shift position sensor 22 is a sensor that outputs an electrical signal indicative of the operation position of the shift lever. The brake stroke sensor 23 is a sensor that outputs an electrical signal indicative of the amount of operation (or the amount of depression) of the operation pedal (or brake pedal) for the friction brake. The crank position sensor 24 is a sensor that outputs an electrical signal indicative of the rotational position of the output shaft (crankshaft) of the internal combustion engine 1. The vehicle speed sensor 25 is a sensor that outputs an electrical signal indicative of the traveling speed of the vehicle. The first SOC sensor 102a is a sensor that outputs an electrical signal indicative of the state of charge of the high voltage battery 102. The second SOC sensor 103a is a sensor that outputs an electrical signal indicative of the state of charge of the low voltage battery 103. The first wheel speed sensor 60 is a sensor that outputs an electrical signal indicative of the rotation speed (angular velocity) of the drive wheels 6. The second wheel speed sensor 70 is a sensor that outputs an electrical signal indicative of the rotation speed (angular velocity) of the undriven wheels 7.

The ECU 20 controls the operation state of the internal combustion engine 1, the gear change state of the transmission 2, and the power generating state of the electric power generation device 100 etc. based on the signals output from the above-described various sensors. In the following, a method of controlling the electric power generation device 100 by the ECU 20 will be described.

The ECU 20 controls the duty cycle for turning on/off the regulator 101a, thereby changing the voltage generated by the alternator 101. Specifically, when making the voltage generated by the alternator 101 higher, the ECU 20 sets the duty cycle in such a way as to make the on-time of the regulator 101a longer (or to make the off-time shorter). On the other hand, when making the voltage generated by the alternator 101 lower, the ECU 20 sets the duty cycle in such a way as to make the on-time of the regulator 101a shorter (or to make the off-time longer). In addition, the ECU 20 senses the actual voltage generated by the alternator 101 and feedback-controls the duty cycle based on the difference between the actual generated voltage and a target generation voltage.

When charging the high voltage battery 102 or when supplying electricity to the high voltage electric load 105, the ECU 20 controls the duty cycle of the regulator 101a in such a way as to make the voltage generated by the alternator 101 equal to a voltage suitable for charging the high voltage battery 102 (which will be hereinafter referred to as the "high voltage") and controls the selector switch 104 in such a way as to connect the input terminal 104a to the first output terminal 104b.

On the other hand, when charging the low voltage battery 103, the ECU 20 controls the duty cycle of the regulator 101a in such a way as to make the voltage generated by the alternator 101 equal to a voltage suitable for charging the low voltage battery 103 (which will be hereinafter referred to as the "low voltage") and controls the selector switch 104 in such a way as to connect the input terminal 104a to the second output terminal 104c.

When the vehicle is decelerating, e.g. when the velocity of the vehicle is higher than zero and the amount of operation of the accelerator pedal is zero, the kinetic energy of the drive wheels 6 is transmitted to the alternator 101 via the drive shaft 5, the differential gear 4, the propeller shaft 3, the transmission 2, and the internal combustion engine 1. In other words, the rotor of the alternator 101 rotates with the rotation of the drive wheels 6 in an interlocked manner. If a field current is supplied to the alternator 101 in this state, the kinetic energy of the drive wheels 6 can be converted into electrical energy (regeneration).

Thus, when the vehicle M is decelerating, the ECU 20 performs a regeneration control in which field current is supplied to the alternator 101 to convert the kinetic energy of the drive wheels 6 into electrical energy (regeneration).

In this process, the electric energy that the alternator 101 can generate is determined by the rotational frequency and the generation voltage of the alternator 101. A target generated electric energy (or target regeneration energy) may be set to an electric energy that the alternator 101 can generate at the high voltage (which will be hereinafter referred to as the "high voltage generated electric energy") or an electric energy that the alternator 101 can generate at the low voltage (which will be hereinafter referred to as the "low voltage generated electric energy"), whichever is the larger.

It is necessary that the electrical energy generated by the alternator 101 be stored by charging the high voltage battery 102 or the low voltage battery 103. Therefore, the target generated electric energy (or target regeneration energy) may be set to an electric energy with which the high voltage battery 102 can be charged (which will be hereinafter referred to as the "high voltage charging electric energy") or an electric energy with which the low voltage battery 103 can be charged (which will be hereinafter referred to as the "low voltage charging electric energy"), whichever is the larger. If the high voltage charging electric energy and the low voltage charging electric energy are small, the target generated electric energy (target regeneration energy) may be set on the assumption that the power generated by the alternator 101 is supplied to the high voltage electric load 105.

If the target generated electric energy (target regeneration energy) of the alternator 101 is determined by the above-described method, there is a possibility that the regenerative braking force acting on the vehicle M becomes excessively large. Then, it is possible that the vehicle M is decelerated more than expected by the driver. In particular, if the regenerative braking force becomes excessively large during deceleration without a braking operation (during deceleration in which the output signal of the brake stroke sensor 23 is zero), the vehicle M and the internal combustion engine 1 can stop. Furthermore, if the regenerative braking force becomes excessively large while the vehicle is traveling on a low friction road surface, the drive wheels 6 can slip.

One countermeasure against the above-described situation may be to anticipate the occurrence of slippage of the wheels beforehand and to reduce the regenerative braking force (i.e. decreasing the generated electric energy). However, with this countermeasure, there may be a case in which the time interval since the time at which slippage of the wheels is anticipated to occur until the wheels actually slip is long and a case in which the wheels do not slip actually contrary to the anticipation. In such cases, the amount of regenerated kinetic energy will become smaller.

In the regeneration control in this embodiment, the ECU 20 is adapted to delay the reduction of the regenerative braking force until the drive wheels 6 actually slip, while the vehicle is decelerating without a braking operation. In other words, the ECU 20 is adapted to decrease the electric energy generated by the alternator 101 at the time when slippage of the drive wheels 6 is detected while the vehicle is decelerating without a braking operation.

With this regeneration control, the amount of regenerated kinetic energy can be increased. Moreover, since the regenerative braking force is reduced at the time when the drive wheels 6 slip, the drive wheels 6 can get out of slipping to grip the road again.

Figure 3:
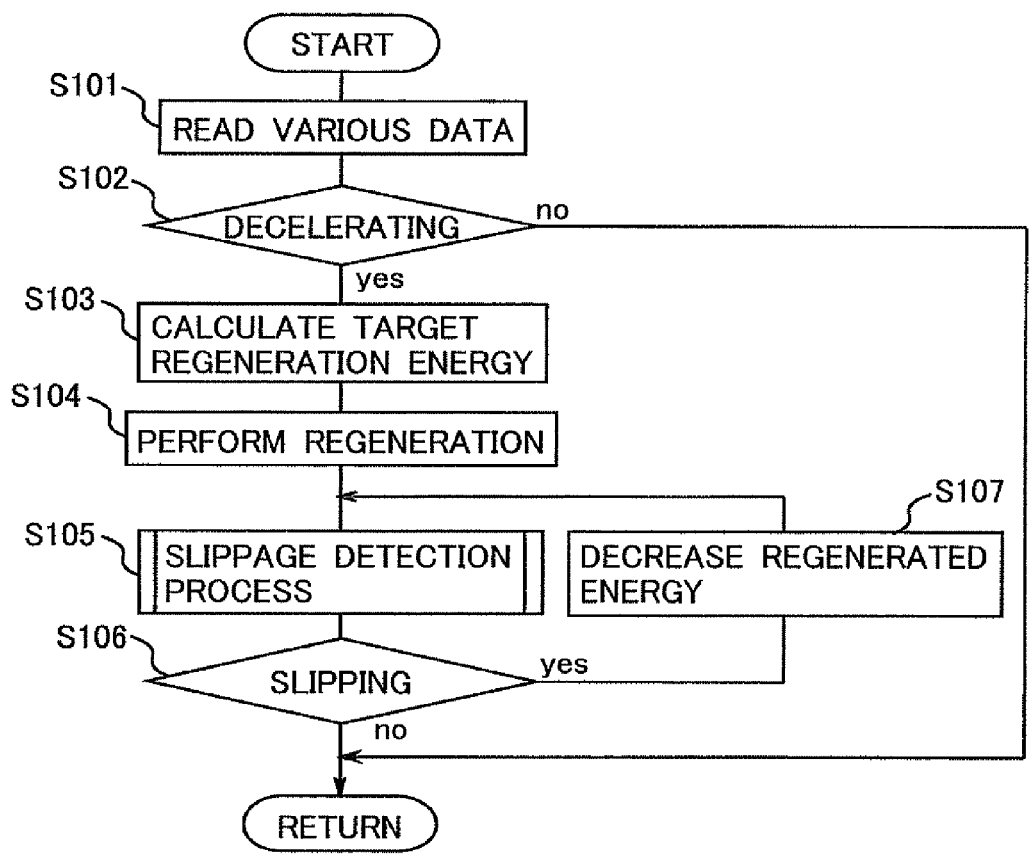
FIG. 3 is a flow chart of a main routine of regeneration control according to the first embodiment.
Figure 4:
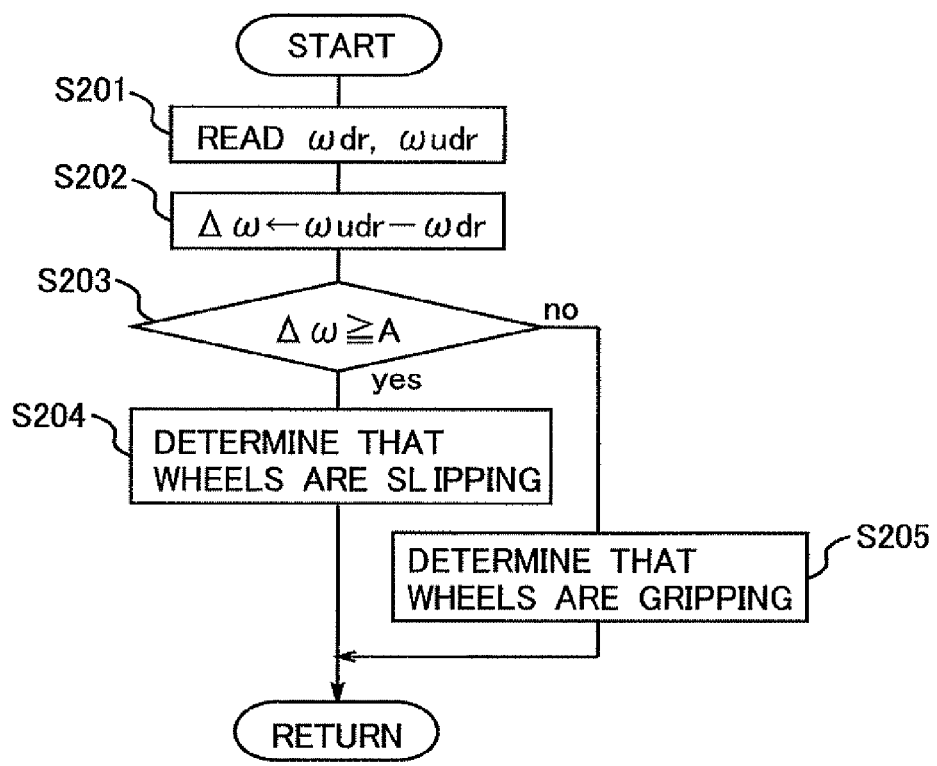
FIG. 4 is a flow chart of a subroutine of the regeneration control according to the first embodiment.

In the following, the process of executing the regeneration control in this embodiment will be described with reference to FIGS. 3 and 4. FIG. 3 is a flow chart of the main routine of the regeneration control. FIG. 4 is a flow chart of a subroutine of the regeneration control. These routines are stored in a ROM of the ECU 20 in advance and executed at regular intervals by the ECU 20.

Firstly, in the main routine shown in FIG. 3, the ECU 20 reads, in step S101, various data including the output signal of the accelerator position sensor 21 (accelerator opening degree), the output signal of the shift position sensor 22 (shift position), and the output signal of the vehicle speed sensor 25 (vehicle velocity).

In step S102, the ECU 20 determines, based on the various data read in the above step S101, whether or not the vehicle M is decelerating. Specifically, the ECU 20 determines that the vehicle M is decelerating when the output signal of the accelerator position sensor 21 (accelerator opening degree) is zero (close), the output signal of the vehicle speed sensor 25 (vehicle velocity) is larger than zero, and the output signal of the brake stroke sensor 23 (the amount of depression of the brake pedal) is zero.

If the determination in the above step S102 is negative, the ECU 20 terminates the execution of the main routine. On the other hand, if the determination in the above step S102 is affirmative, the ECU 20 proceeds to step S103.

In step S103, the ECU 20 calculates a target regeneration energy (target electric energy generated by the alternator 101). Specifically, the ECU 20 calculates the electric energy that the alternator 101 can generate at the high voltage (high voltage generated electric energy) and the electric energy that the alternator 101 can generate at the low voltage (low voltage generated electric energy), using the rotational frequency of the alternator 101 as a parameter. The ECU 20 calculates the electric energy with which the high voltage battery 102 can be charged (high voltage charging electric energy), using the output signal of the first SOC sensor 102$a$ as a parameter. In addition, the ECU 20 calculates the electrical energy with which the low voltage battery 103 can be charged (low voltage charging electric energy), using the output signal of the second SOC sensor 103$a$ as a parameter. The ECU 20 compares the high voltage generated electric energy or the high voltage charging electric energy, which ever is the smaller, and the low voltage generated electric energy or the low voltage charging electric energy, whichever is the smaller, and sets one of the compared values that is determined to be larger as the target generated electrical energy.

In step S104, the ECU 20 causes the alternator 201 to operate in accordance with the target generated electric energy set in the above step S103 to thereby convert the kinetic energy of the drive wheels 6 into electrical energy (regeneration). Specifically, the ECU 20 controls the duty cycle of the regulator 101$a$ in such a way as to adapt the generation voltage of the alternator 101 to the aforementioned target generated electric energy. Furthermore, the ECU 20 controls the selector switch 104 in such a way that the generated electric power is supplied to the battery 102, 103 to be charged.

As described above, the regeneration unit according to the present invention is implemented by the execution of the processing of the above-described steps S102 to S104 by the ECU 20.

In step S105, the ECU 20 executes the process of detecting slippage of the drive wheels 6 (slippage detection process). In doing so, the ECU 20 executes the slippage detection process in accordance with the subroutine shown in FIG. 4.

In step S201 in the subroutine shown in FIG. 4, the ECU 20 reads the output signal $\omega$dr of the first wheel speed sensor 60 (angular velocity of the drive wheels 6) and the output signal $\omega$udr of the second wheel speed sensor 70 (angular velocity of the undriven wheels 7).

In step S202, the ECU 20 calculates the difference $\Delta\omega$ between the angular velocity $\omega$dr of the drive wheels 6 and the angular velocity $\omega$udr of the undriven wheels 7 ($\Delta\omega=\omega$udr−$\omega$dr). Then, the ECU 20 proceeds to step S203, where it determines whether or not the difference $\Delta\omega$ calculated in the above step S202 is equal to or higher than a predetermined criterion value A. The criterion value A is equal to the value of the difference $\Delta\omega$ at the time when the drive wheels 6 starts to slip. The criterion value A is experimentally determined in advance.

If the determination in the above step S203 is affirmative, the ECU 20 proceeds to step S204, where it determines that the drive wheels 6 are slipping. On the other hand, if the determination in the above step S203 is negative, the ECU 20 proceeds to step S205, where it determines that the drive wheels 6 are not slipping (are gripping the road).

As described above, the detection unit according to the present invention is implemented by the execution of the subroutine in FIG. 4 by the ECU 20.

Returning to the main routine in FIG. 3, the ECU 20 proceeds to step S106. In step S106, the ECU 20 determines whether or not it is determined in the above-described slippage detection process that the drive wheels 6 are slipping. If the determination in the above step S106 is affirmative, the ECU 20 proceeds to step S107, where it decreases the recovered kinetic energy (i.e. the electric energy generated by the alternator 101). Specifically, the ECU 20 changes the duty cycle of the field current so as to decrease the electric energy generated by the alternator 101. The ECU 20 executes the processing of step S105 and the subsequent steps again after executing the processing of step S107.

As described above, the control unit according to the present invention is implemented by the execution of the processing of the above-described steps S106 and S107 by the ECU 20.

The amount of decrease of the generated electric energy in the above step S107 may be a fixed value determined in advance or a variable value that is set larger when the aforementioned difference $\Delta\omega$ is large than when it is small. In the case where the amount of decrease of the generated electric energy is set to be a fixed value, the generated electrical energy is decreased gradually until the drive wheels 6 get out of slipping to grip the road again. Therefore, the regenerated energy can be made as much as possible on condition that slippage of the drive wheels 6 can be prevented. On the other hand, in the case where the amount of decrease of the generated electric energy is set to be a variable value, the drive wheels 6 can quickly get out of slipping to grip the road again.

When the regeneration control is executed in the above-described manner, the electric energy generated by the alternator 101 is decreased at the time when the drive wheels 6 actually slip. Therefore, the recovered kinetic energy can be made larger as compared to the case where the electric energy generated by the alternator 101 is decreased based on an anticipation of slippage of the drive wheels 6 made in advance.

Embodiment 2

Next, a second embodiment of the regeneration control system for a vehicle according to the present invention will be described with reference to FIGS. 5 and 6. Here, portions different from those in the first embodiment described above will be described, and like portions will not be described.

What is different in this embodiment from the first embodiment described above resides in the method of executing the slippage detection process. In the first embodiment described above, a case in which slippage of the drive wheels 6 is detected based on the difference between the angular velocity of the wheels (drive wheels) that are mechanically interlocked with the alternator 101 and the angular velocity of the wheels (undriven wheels) that are not mechanically interlocked with the alternator is described. In this embodiment, in contrast, slippage of the drive wheels 6 is detected based on the rate of decrease of the electric energy generated by the alternator 101.

Figure 5:
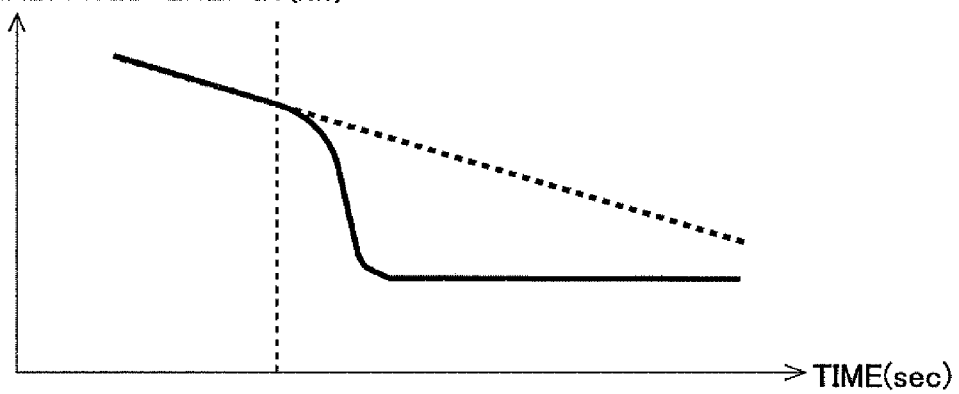
FIG. 5 is a time chart showing the change in the angular velocity of drive wheels and the electric energy generated by an alternator (regenerated energy) with time while the regeneration control is executed.
Figure 5:
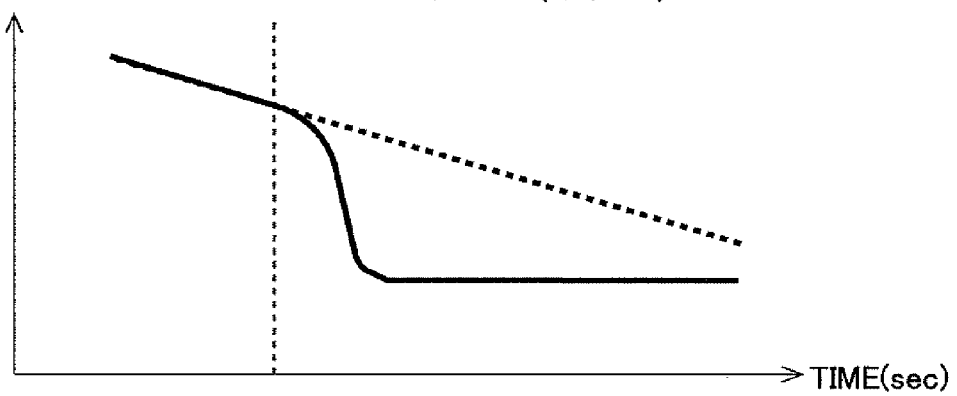

FIG. 5 is a timing chart showing the change in the angular velocity of the drive wheels 6 and the electric energy generated by the alternator 101 (regenerated energy) with time during the execution of the regeneration control. The solid lines in FIG. 5 represent the regenerated energy and the angular velocity in a case where the drive wheels 6 slip, and broken lines in FIG. 5 represent the regenerated energy and the angular velocity in a case were the drive wheels 6 do not slip.

When the drive wheels 6 slip, the angular velocity of the drive wheels 6 decreases abruptly, and accordingly the electric energy generated by the alternator 101 (regenerated energy) also decreases abruptly. In view of this, in the regeneration control in this embodiment, the ECU 20 compares the time derivative of the generated electric energy with a criterion value B to thereby determine whether or not the drive wheels 6 are slipping. The criterion value B is equal to the time derivative of the generated electric energy at the time when the drive wheels 6 start to slip. The criterion value B is determined in advance experimentally.

In the following, how the slippage detection process in this embodiment is executed will be described with reference to FIG. 6. FIG. 6 is a flow chart of a subroutine executed in step S105 of the main routine described above (see FIG. 3). In FIG. 6, the processing steps same as those in the subroutine in the above-described first embodiment (see FIG. 4) are designated by the same reference numerals.

Figure 6:
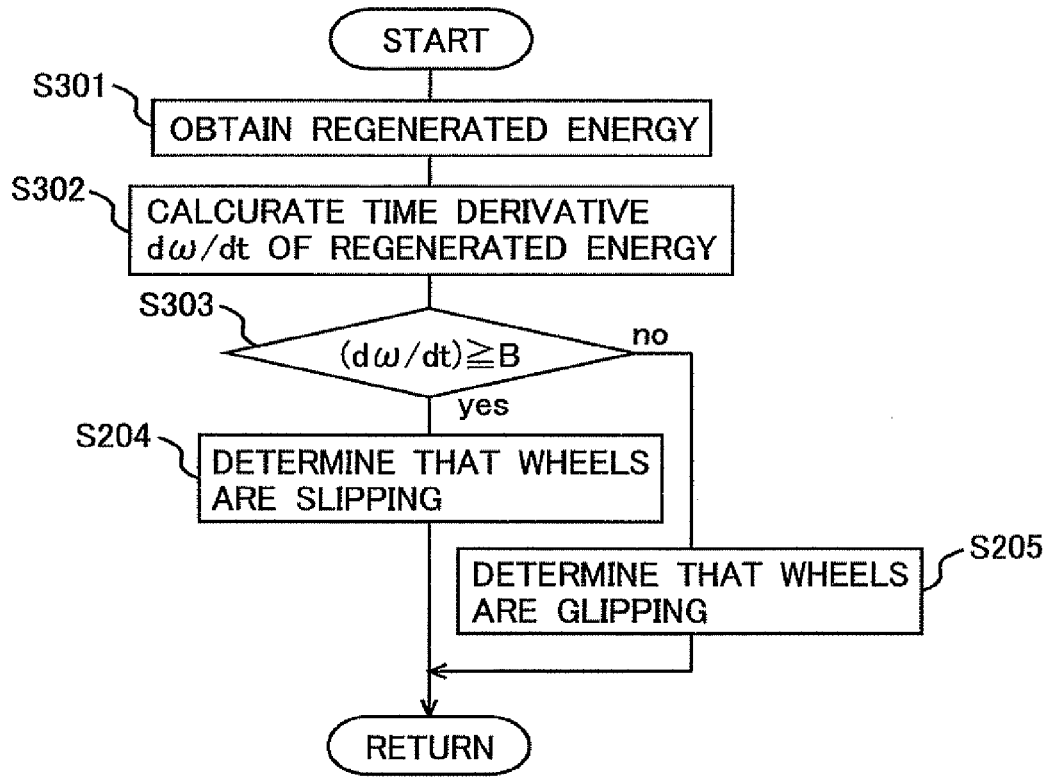
FIG. 6 is a flow chart of a subroutine of regeneration control according to a second embodiment.

In the subroutine in FIG. 6, in step S301, the ECU 20 obtains the value of the electric energy generated by the alternator 101 (regenerated energy). Specifically, the ECU 20 obtains the change in the generated electric energy (regenerated energy) per a certain period of time.

In step S302, the ECU 20 calculates the time derivative $d\omega/dt$ of the change in the electric energy (regenerated energy) obtained in the above step S301. Then, the ECU 20 proceeds to step S303, where it determines whether or not the time derivative $d\omega/dt$ calculated in the above step S302 is equal to or larger than the criterion value B.

If the determination in step S303 is affirmative, the ECU 20 proceeds to step S204. If the determination in the above step S303 is negative, the ECU 20 proceeds to step S205.

By executing the subroutine of FIG. 6 by the ECU 20, slippage of the drive wheels 6 can be detected even if the vehicle M is not equipped with a wheel speed sensor. In consequence, the advantages same as the first embodiment can be enjoyed.

Embodiment 3

Next, a third embodiment of the regeneration control system for a vehicle according to the present invention will be described with reference to FIGS. 7 and 8. Here, portions different from those in the first embodiment described above will be described, and like portions will not be described.

What is different in this embodiment from the first embodiment described above resides in that the electric energy generated by the alternator 101 (regenerated energy) is decreased also when the deceleration of the vehicle M becomes excessively high in addition to when slippage of the drive wheels 6 is detected.

If the regenerative braking force becomes excessively large during deceleration without a braking operation (operation of the brake pedal) by the driver, the decrease in the vehicle speed can be larger than expected by the driver. Then, there is a possibility that the vehicle M stops despite the absence of a braking operation by the driver. Inadvertent stoppage of the vehicle M can produce stalling of the internal combustion engine 1 (engine stalling).

In view of the above, in the regeneration control according to this embodiment, the ECU 20 is adapted to decrease the electric energy generated by the alternator 101 (regenerated energy) when the deceleration of the vehicle M exceeds a predetermined upper limit value, even if the drive wheels 6 are not slipping. By this regeneration control, a situation in which the vehicle M is decelerated more than expected by the driver can be prevented from occurring. Therefore, the drivability of the vehicle M can be improved.

In the following, the process of executing the regeneration control in this embodiment will be described with reference to FIGS. 7 and 8. FIG. 7 is a flow chart of the main routine of the regeneration control in this embodiment. FIG. 8 is a flow chart of a subroutine for determining whether or not the deceleration of the vehicle M is excessively high (which routine will be hereinafter referred to as the "deceleration determination process"). In FIG. 7, the processing steps same as those in the above-described first embodiment (see FIG. 3) are designated by the same reference numerals.

Figure 7:
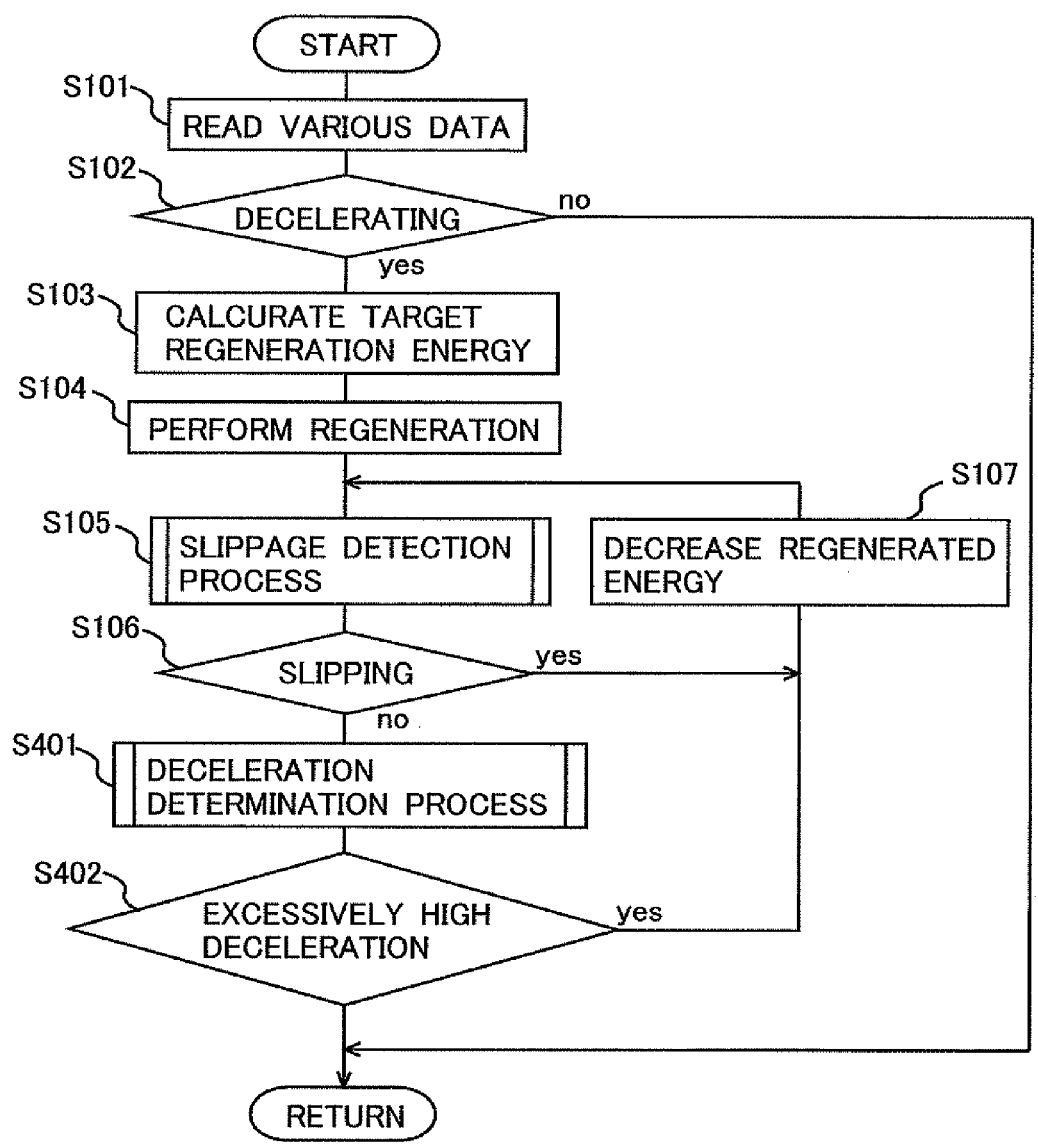
FIG. 7 is a flow chart of a main routine of regeneration control according to a third embodiment.

In FIG. 7, if the determination in step S106 is negative, namely if it is determined that the drive wheels 6 are not slipping, the ECU 20 proceeds to step S401. In step S401, the ECU 20 executes the deceleration determination process. In doing so, the ECU 20 executes the deceleration determination process in accordance with the subroutine in FIG. 8.

Figure 8:
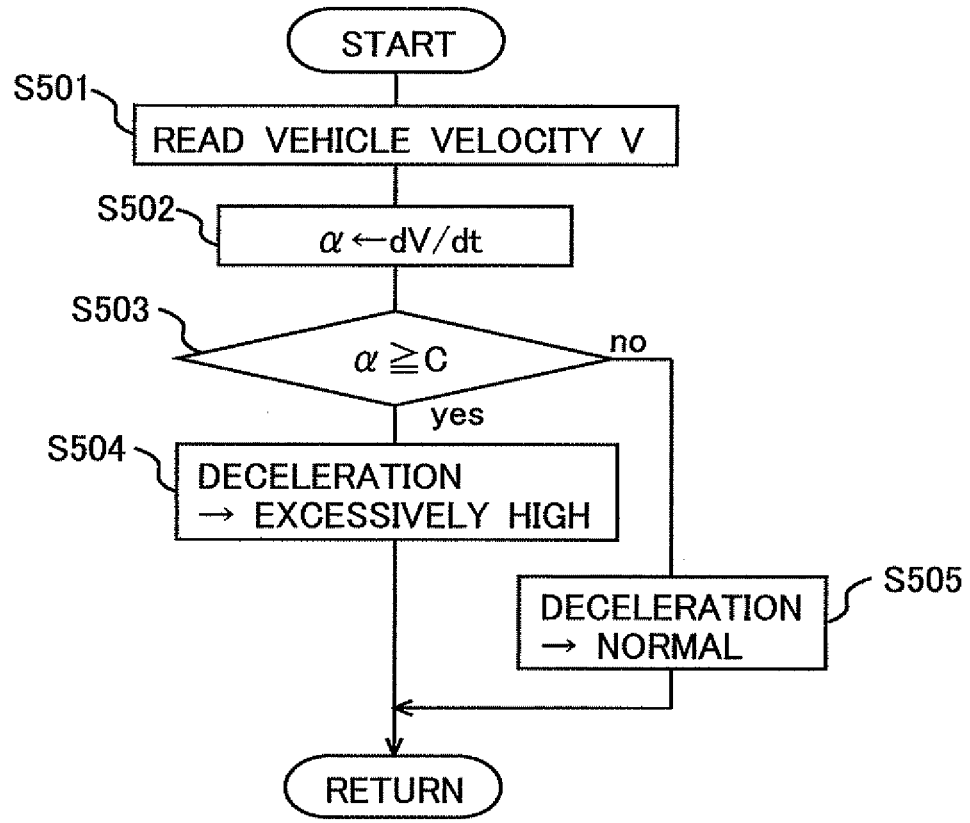
FIG. 8 is a flow chart of a subroutine of the regeneration control according to the third embodiment.

In the subroutine in FIG. 8, in step S501, the ECU 20 reads the output signal V of the vehicle speed sensor 25 (vehicle velocity). Then, the ECU 20 proceeds to step S502, where it calculates the deceleration a ($=dV/dt$) of the vehicle M by differentiating the vehicle velocity V with respect to time.

In step S503, the ECU 20 determines whether or not the deceleration a calculated in the above step S502 is equal to or larger than an upper limit value C. The upper limit value C is equal to the highest deceleration that is considered to be acceptable to the driver during deceleration without a braking operation. The upper limit value C is determined in advance by an adaptation process based on, for example, an experiment. Since the highest deceleration acceptable to the driver changes depending on the vehicle velocity and the shift position, the upper limit value may be varied using the output signal of the vehicle speed sensor 25 and the output signal of the shift position sensor 22 as parameters. In this case, the relationship between the upper limit value versus the vehicle velocity and the shift position may be prepared in advance as a map.

If the determination in the above step S503 is affirmative, the ECU 20 proceeds to step S504, where it determines that the deceleration of the vehicle M is excessively high. On the other hand, if the determination in the above step S503 is negative, the ECU 20 proceeds to step S505, where it determines that the deceleration of the vehicle M is normal.

After completing the execution of the subroutine in FIG. 8, the ECU 20 returns to the main routine in FIG. 7 and executes the processing of step S402. In step S402, the ECU 20 determines whether or not it is determined in the above-described deceleration determination process that the deceleration of the vehicle M is excessively high. If the determination in step S402 is affirmative, the ECU 20 proceeds to step S107, where it decreases the electric energy generated by the alternator 101 (generated energy).

As described above, by executing the regeneration control according to FIGS. 7 and 8 by the ECU 20, an excessive drop of the vehicle velocity V can be prevented from occurring during deceleration without a braking operation by the driver. In consequence, the stoppage of the vehicle M unexpected by the driver and stalling of the internal combustion engine 1 caused by the inadvertent stoppage of the vehicle M can be prevented from occurring. Therefore, the drivability of the vehicle M during deceleration without a braking operation can be improved.

The regeneration control according to this embodiment may be used in combination with the slippage detection process described in the second embodiment, as a matter of course.

DESCRIPTION OF THE REFERENCE SIGNS

1: internal combustion engine
2: transmission
3: propeller shaft
4: differential gear
5: drive shaft
6: drive wheel
7: undriven wheel
20: ECU
21: accelerator position sensor
22: shift position sensor
23: brake stroke sensor
24: crank position sensor
25: vehicle speed sensor
60: first wheel speed sensor
70: second wheel speed sensor
100: electric power generation device
101: alternator
101a: regulator
102: high voltage battery
102a: first SOC sensor
103: low voltage battery
103a: second SOC sensor
104: selector switch
104a: input terminal
104b: first output terminal
104c: second output terminal
105: high voltage electric load

The invention claimed is:

1. A regeneration control system for a vehicle comprising:
a generator that can be mechanically interlocked with a wheel of the vehicle;
a regeneration unit for converting kinetic energy of said wheel into electrical energy by actuating said generator while said vehicle is decelerating;
a detection unit for detecting slippage of said wheel while said generator is actuated by said regeneration unit, and for determining that the wheel is slipping if a degree of decrease in the electric energy generated by said generator exceeds a predetermined criterion value; and
a control unit for decreasing the electric energy generated by said generator at a time when slippage of said wheel is detected by said detection unit.

2. The regeneration control system according claim 1, wherein the degree of decrease in the electric energy generated by said generator is measured by calculating a time derivative of a change in the electric energy per a certain period of time.

* * * * *